Figure 1:
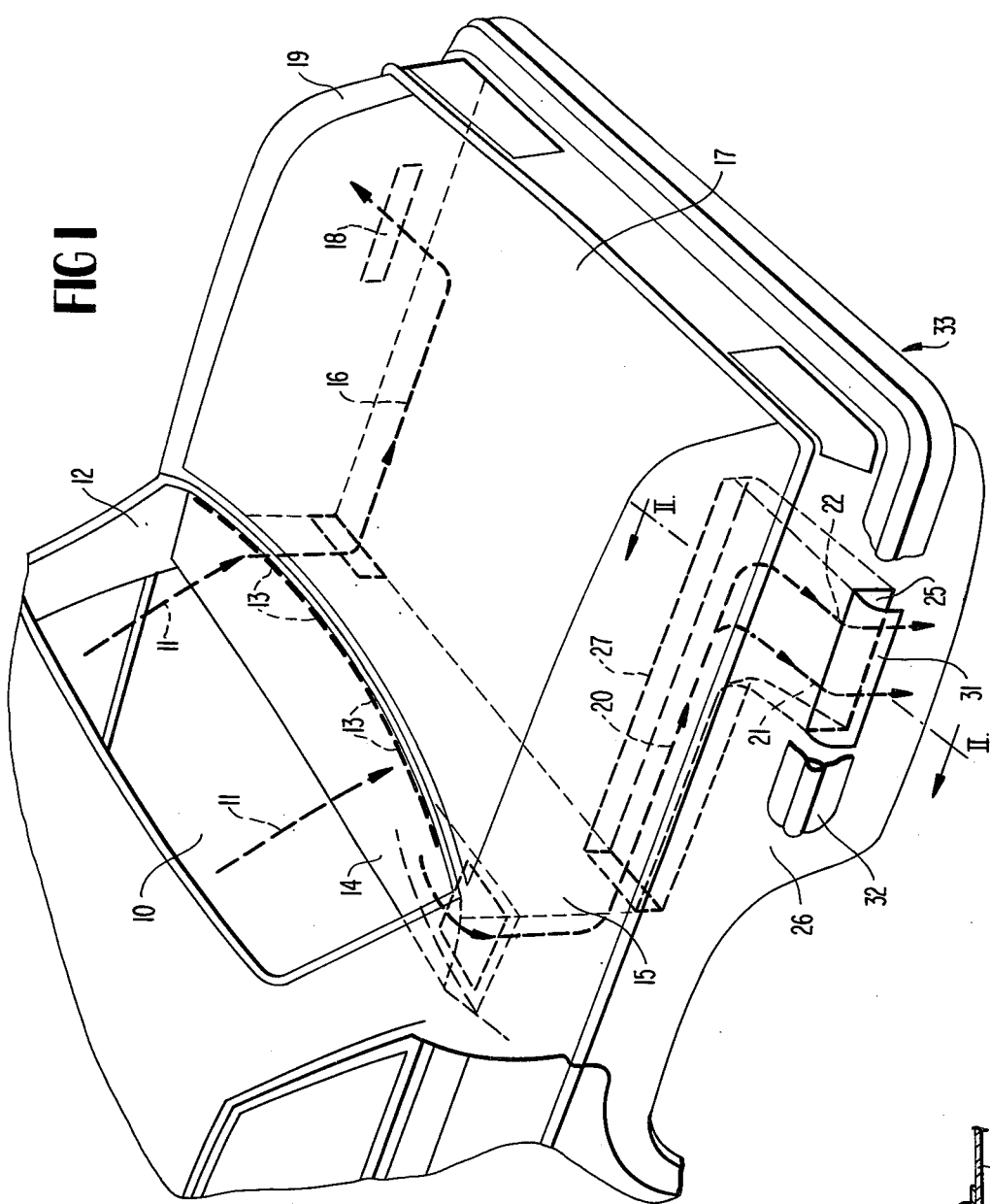

United States Patent [19]

Götz et al.

[11] 4,144,803
[45] Mar. 20, 1979

[54] PASSENGER SPACE VENTILATION FOR MOTOR VEHICLES, ESPECIALLY FOR PASSENGER MOTOR VEHICLES

[75] Inventors: Hans Götz, Böblingen; Albert Hack, Sindelfingen; Hans Winz, Horb-Isenburg, all of Fed. Rep. of Germany

[73] Assignee: Daimler-Benz Aktiengesellschaft, Fed. Rep. of Germany

[21] Appl. No.: 762,518

[22] Filed: Jan. 26, 1977

[30] Foreign Application Priority Data

Jan. 29, 1976 [DE] Fed. Rep. of Germany ....... 2603297

[51] Int. Cl.² ............................................. B60H 1/24
[52] U.S. Cl. ...................................... 98/2.18; 98/2.04
[58] Field of Search ................... 98/2, 2.04, 2.18, 2.16; 62/244, 412

[56] References Cited

U.S. PATENT DOCUMENTS

| 2,750,864 | 6/1956 | Maki | 98/2.18 |
| 2,802,692 | 8/1957 | Stocks | 98/2.18 |
| 2,849,941 | 9/1958 | Negoro | 98/2.18 |
| 2,853,932 | 9/1958 | Freydl | 98/2.18 |
| 3,236,169 | 2/1966 | Starnaman | 98/2.18 |
| 3,388,654 | 6/1968 | Aldrich, Jr. et al. | 98/2.18 |
| 3,554,110 | 1/1971 | Goetz | 98/2.18 |

Primary Examiner—Henry C. Yuen
Attorney, Agent, or Firm—Craig & Antonelli

[57] ABSTRACT

A passenger-space ventilation system for motor vehicles, especially for passenger motor vehicles, in which the used-up passenger-space exhaust air, after its discharge out of the passenger space but prior to its discharge into the outside air stream flowing about the vehicle, is conducted past heated-up vehicle parts for purposes of cooling the same.

38 Claims, 2 Drawing Figures

U.S. Patent   Mar. 20, 1979   4,144,803

PASSENGER SPACE VENTILATION FOR MOTOR VEHICLES, ESPECIALLY FOR PASSENGER MOTOR VEHICLES

The present invention relates to a passenger-space ventilation for motor vehicles, especially for passenger motor vehicles, in which the used-up or stale passenger-space air is conducted toward the outside through openings in the rear area of the body.

In a large number of known motor vehicles, ventilation systems are provided which serve to conduct the used-up passenger-space air toward the outside, i.e., into the atmosphere. The suction openings required therefore are arranged partly within doors and longitudinal bearers, but predominantly around the rear window-pane (at the top, on the sides and at the bottom); the air outlets are thereby provided in door gaps, rear columns, as well as luggage-lid longitudinal- and cross-gaps. The used-up passenger-space air is therefore conducted toward the outside into the air stream flowing about the vehicle in the known ventilation systems either by way of special channels through the rear column or—in more simple constructions—directly into the luggage space and, from there, through the luggage-lid gaps.

In motor vehicles, especially in passenger motor vehicles, the problem frequently arises that certain vehicle parts, be it as a result of the sun rays or of the engine heat—are heated up more or less strongly which leads to undesirable side effects. In that connection, the tank space should be mentioned at first which—for safety reasons—is arranged with an ever-increasing number of vehicles between the luggage space and the passenger space. The tank space heats up above all during standstill of the vehicle in case of intense exposure to the sun rays, but then cools off only relatively slowly during the subsequent drive. This becomes noticeable in an unfavorable manner by the ensuing high fuel temperatures.

As another example should be mentioned the exhaust system which heats up the luggage space in an undesirable manner by way of the floor thereof.

In order to keep the undesirable heating of the respective vehicle parts within acceptable limits, a considerable expenditure in heat-insulating measures is practiced in the known vehicles.

The present invention is now concerned with the task to prevent an undesirable heat-up of certain vehicle parts without having to practice the heretofore required expenditure in thermal insulation. According to the basic concepts of the present invention, the problem is solved in the vehicles with a passenger space ventilation system of the type described hereinabove in that the used-up passenger-space air, after the discharge out of the passenger space but prior to the discharge into the outside air stream about the vehicle, is conducted past heated-up vehicle parts for the purpose of cooling the same. Preferably, the used-up passenger-space air is to serve according to the present invention for the cooling of the tank space and/or of the luggage space. Either the entire used-up passenger-space air or only a part thereof can be used for that purpose.

The advantage of the present invention therefore essentially resides in that considerable heat quantities can be removed by means of the used-up passenger-space exhaust air by the use of a predetermined forced-air conduction so that other, more expensive shielding and insulating measures can be dispensed with.

Whereas for purposes of cooling the tank space, the used-up passenger-space air can be conducted through the same without special guide means, it is appropriate for the purpose of taking along the heat radiated by the exhaust installation onto the luggage floor, to provide a special air-conduction channel which is preferably arranged within the area of the main muffler of the exhaust system and may extend between the luggage-space floor above the exhaust installation and a double floor arranged above the luggage space floor.

In order to keep as short as possible the path of the used-up passenger exhaust air, a further feature of the present invention is characterized in that a lateral outlet or discharge for the used-up passenger-space air is provided in at least one of the two rear fenders, through which the used-up passenger-space air reaches the outside into the stream about the vehicle after cooling the heated vehicle parts.

Accordingly, it is an object of the present invention to provide a passenger-space ventilation for motor vehicles, especially for passenger motor vehicles, which avoids by simple means the aforementioned shortcomings and drawbacks encountered in the prior art.

Another object of the present invention resides in a passenger-space ventilation system for passenger motor vehicles which is simple in construction, relatively inexpensive in manufacture and highly effective to cool off heated-up vehicle parts.

A further object of the present invention resides in a passenger-space ventilation system for motor vehicles which is effective to keep within acceptable limits the undesired heating-up of certain vehicle parts without the need of considerable expenditures for thermal insulation.

Still a further object of the present invention resides in a passenger-space ventilating system which prevents the heating-up of certain vehicle parts without necessitating the stuctural expenditures required heretofore to provide an effective thermal insulation.

Another object of the present invention resides in a passenger-space ventilation system for motor vehicles which utilizes the exhaust air from the passenger space for purposes of cooling certain vehicle parts.

Figure 2:
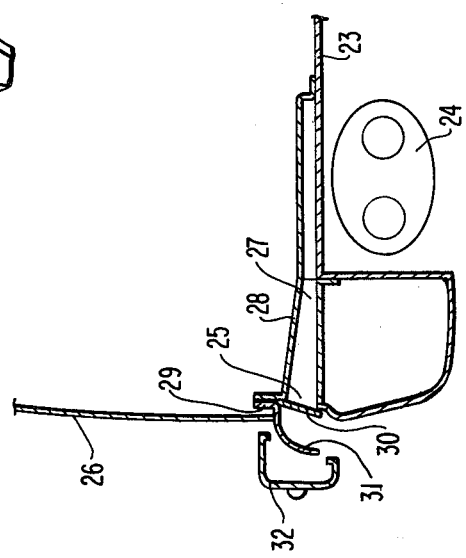

These and other objects, features and advantages of the present invention will become more apparent from the following description when taken in connection with the accompanying drawing which shows, for purposes of illustration only, one embodiment in accordance with the present invention, and wherein:

FIG. 1 is a somewhat schematic perspective view of the rear part of the body of a passenger motor vehicle equipped with a ventilation system in accordance with the present invention; and FIG. 2 is a schematic cross-sectional view, taken along line II—II of FIG. 1.

Referring now to the drawing wherein like reference numerals are used throughout the two views to designate like parts, and more particularly to FIG. 1, the used-up passenger-space air is conducted out of the passenger space designated by reference numeral 10 in the downward direction after being previously conducted in the direction of the arrow 11 along the rear window 12 by way of slot-shaped suction openings 13 in the hat-storage shelf 14. The passenger-space exhaust air thereby reaches at first the tank space of the vehicle designated by reference numeral 15 and subsequently—as indicated by an arrow 16—without special channel conduction the luggage space designated by reference numeral 17. From there, the passenger-space exhaust air reaches the flow of air about the vehicle on the outside by way of the schematically indicated ventilation openings 18 in the right rear fender 19.

The other half of the vehicle exhaust air, after flowing through the tank space 15, is conducted along the luggage space floor 23 (FIG. 2) above the main muffler 24 of the exhaust system and only then reaches the outside or atmosphere through a lateral discharge opening 25 in the left rear fender 26. An air guide channel 27 indicated in FIG. 1 in dash lines serves for the air conduction within the area of the exhaust system, which is constructed rectangularly and extends from the tank space 15 up to the discharge opening 25 in the fender 26. It can be seen from FIG. 2 that the air conduction channel 27 is formed, on the one hand, by the luggage space floor 23 and, on the other, by a double floor 28 disposed thereabove. An effective entrainment of the heat quantity given off by the exhaust installation 24 to the luggage space floor 23 results therefrom.

It can be further seen from FIG. 2 that the discharge opening 25 is closed off against the outside by a check valve or non-return flap 30 which is pivotally suspended at 29. The non-return flap 30 is constructed as a flutter valve and consists preferably of a thin rubber. It prevents the penetration of dust and moisture into the air guide channel 27 during the return flow. Furthermore, the discharge opening 25 is covered off against splash water by a scoop 31 which is open in the downward direction and adjoins the fender 26 in the downward direction. The discharge opening 25, the non-return flap 30 as well as the scoop 31 are shielded against visibility from the outside by the part 32 of the rear bumper 33 which is laterally drawn about these parts.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A passenger-space ventilation system for a motor vehicle, in which used-up passenger-space air is conducted from a passenger-space toward the outside atmosphere through openings in a rear area of a vehicle body, characterized by:

means, arranged in the passenger-space, for discharging used-up passenger-space air out of the passenger-space, means, connected at one end to said discharging means, for conducting the used-up passenger-space air past heated-up vehicle parts for purposes of cooling the same, said conducting means including a first section having means for conducting the used-up passenger-space air through the gas tank space which is located between the passenger-space and a luggage space and further including a second section having an open-bottomed air conductor channel extending on a top of a floor of the luggage space provided above an exhaust system, and means, connected to the other end of the conducting means and arranged in the rear area of the vehicle body, for discharging the used-up passenger-spaced air into the outside atmosphere.

2. A ventilation system according to claim 1, characterized in that the conducting means conducts the used-up passenger-space air through the gas tank space of the vehicle for cooling the same.

3. A ventilation system according to claim 2, characterized in that the conducting means conducts the used-up passenger-space air within the area of at least a part of the exhaust system along the luggage space floor for purposes of cooling the latter.

4. A ventilation system according to claim 3, characterized in that the conducting means conducts the used-up passenger-space air at first through the tank space and subsequently within the area of at least a part of the exhaust system along the luggage space floor for the purpose of cooling the tank space and the luggage space floor.

5. A ventilation system according to claim 4, characterized in that the conducting means conducts the entire used-up passenger-space air for cooling purposes.

6. A ventilation system according to claim 4, characterized in that the conducting means conducts only a part of the used-up passenger-space air for cooling purposes.

7. A ventilation system according to claim 4, wherein the means for discharging the used-up passenger-space air out of the passenger-space includes suction slots at the lower edge of the rear window, said suction slots leading into a first section of the conducting means which conducts the used-up passenger-space air approximately vertically in the downward direction through the tank space.

8. A ventilation system according to claim 7, characterized in that, in the first section, the means for conducting the used-up passenger-space air through the gas tank space is the gas tank space itself.

9. A ventilation system according to claim 8, characterized in that the conducting means conducts a part of the used-up passenger-space air from the tank space directly into the luggage space and from there into the atmosphere and in that the conducting means conducts the other part os the used-up passenger-space air, after its discharge out of the tank space, for purposes of cooling the luggage space floor within the area of at least a part of the exhaust system by forced-air conduction and only then exits into the atmosphere.

10. A ventilation system according to claim 9, characterized in that the open-bottomed air conduction channel conducts the used-up passenger-space air past at least one of the exhaust system and the luggage space floor provided above the exhuast system.

11. A ventilation system according to claim 10, characterized in that the air conduction channel is arranged within the area of the main muffler of the exhaust system.

12. A ventilation system according to claim 1, characterized in that the conducting means conducts the used-up passenger-space air within the area of at least a part of the exhaust system along the luggage space floor for purposes of cooling the latter.

13. A ventilation system according to claim 1, characterized in that the conducting means conducts the used-up passenger-space air at first through the tank space and subsequently within the area of at least a part of the exhaust system along the luggage space floor for the purpose of cooling the tank space and the luggage space floor.

14. A ventilation system according to claim 1, characterized in that the conducting means conducts the entire used-up passenger-space air is utilized for cooling purposes.

15. A ventilation system according to claim 1, characterized in that the conducting means conducts only a part of the used-up passenger-spaceair for cooling purposes.

16. A ventilation system according to claim 1, for passenger motor vehicles, in which the means for discharging the used-up passenger-space air out of the passenger-space includes suction slots at the lower edge of the rear window, said suction slots leading into a first section of the conducting means which conducts the used-up passenger-space air approximately vertically in the downward direction through the tank space.

17. A ventilation system according to claim 16, characterized in that the conducting means conducts a part of the used-up passenger-space air from the tank space directly into the luggage space and from there into the atmosphere, and in that the conducting means conducts the other part of the used-up passenger-space air, after its discharge out of the tank space, for purposes of cooling the luggage space floor within the area of at least a part of the exhaust system by forced-air conduction and only then exits into the atmosphere.

18. A ventilation system according to claim 1, characterized in that the open-bottomed air conduction channel conducts the used-up passenger-space air past at least one of the exhaust system and the luggage space floor provided above the exhaust system.

19. A ventilation system according to claim 18, characterized in that the air conduction channel is arranged within the area of the main muffler of the exhaust system.

20. A ventilation system according to claim 18, characterized in that the air conduction channel is constructed angularly shaped and extends from the tank space up to the lateral discharge bar the used-up passenger-space air within the rear fender.

21. A ventilation system according to claim 1, characterized in that the air conduction channel extends between the luggage space floor above the exhaust system and a double floor arranged above the luggage space floor.

22. A ventilation system according to claim 1, characterized in that the means for discharging the used-up passenger-space air into the atmosphere includes a lateral discharge for the used-up passenger-space air provided in at least one of the two rear fenders through which it reaches the atmosphere after passing through the conducting means for cooling at least one heated-up vehicle part.

23. A ventilation system according to claim 22, characterized in that the lateral discharge is arranged in that rear fender, into the area of which extends also the exhaust system.

24. A ventilation system according to claim 22, characterized in that the lateral discharge is closed off against the outside atmosphere by a check flap.

25. A ventilation system according to claim 24, characterized in that the check flap is constructed as a flutter valve.

26. A ventilation system according to claim 25, characterized in that the flutter valve consists of a thin rubber.

27. A ventilation system according to claim 24, characterized in that the lateral discharge is covered by a scoop open in the downward direction.

28. A ventilation system according to claim 22, characterized in that the lateral discharge is externally shielded against visibility by the rear bumper.

29. A passenger-space ventilation system for a motor vehicle, in which used-up passenger-space air is conducted from a passenger-space toward the outside atmosphere through openings in a rear area of a vehicle body, characterized by:

means, arranged in the passenger-space, for discharging used-up passenger-space air out of the passenger-space, means, connected at one end to said discharging means, for conducting the used-up passenger-space air past heated-up vehicle parts for purposes of cooling the same, and means, connected to the other end of the conducting means and arranged in the rear area of the vehicle body, for discharging the used-up passenger-space air into the outside atmosphere, wherein the conducting means conducts the used-up passenger-space air to a tank space of the vehicle for cooling the same, wherein the conducting means conducts the used-up passenger-space air within the area of at least a part of the exhaust system along the luggage space floor for purposes of cooling the same, wherein the conducting means conducts the used-up passenger-space air at first through the tank space and subsequently within the area of at least a part of the exhaust system along the luggage space floor for the purpose of cooling the tank space and the luggage space floor, wherein the tank space is located between the passenger space and the luggage space, and wherein the means for discharging the used-up passenger-space air out of the passenger-space includes suction slots at the lower end of the rear window, said suction slots leading into a first section of the conducting means which conducts the used-up passenger-space air approximately vertically in the downward direction through the tank space, wherein, in the first section, the means for conducting the used-up passenger-space air through the gas tank space is the gas tank space itself, wherein the conducting means conducts a part of the used-up passenger-space air from the tank space directly into the luggage space and from there into the atmosphere, and wherein the conducting means conducts the other part of the used-up passenger-space air, after its discharge out of the tank space, for purposes of cooling the luggage space floor within the area of at least a part of the exhaust system by forced-air conduction and only then exits into the atmosphere, wherein a second section of the conducting means includes an air conduction channel for the conduction of the used-up passenger-space air past at least one of the exhaust system and luggage space floor provided above the exhaust system, wherein the air conduction channel is arranged within the area of the main muffler of the exhaust system, and wherein the air conduction channel extends between the luggage space floor above the exhaust system and a double floor arranged above the luggage space floor.

30. A ventilation system according to claim 29, characterized in that the means for discharging the used-up passenger-space air into the atmosphere includes a lateral discharge for the used-up passenger-space air provided in at least one of the two rear fenders through which it reaches the atmosphere after passing through the conducting means for cooling at least one heated-up vehicle part.

31. A ventilation system according to claim 30, characterized in that the lateral discharge is arranged in that rear fender, into the area of which extends also the exhaust system.

32. A ventilation system according to claim 31, characterized in that the air conduction channel is constructed angularly shaped and extends from the tank space up to the lateral discharge for the used-up passenger-space air within the rear fender.

33. A ventilation system according to claim 32, characterized in that the lateral discharge is closed off against the outside atmosphere by a check flap.

34. A ventilation system according to claim 33, characterized in that the check flap is constructed as a flutter valve.

35. A ventilation system according to claim 34, characterized in that the flutter valve consists of a thin rubber.

36. A ventilation system according to claim 34, characterized in that the lateral discharge is covered by a scoop open in the downward direction.

37. A ventilation system according to claim 36, characterized in that the lateral discharge is externally shielded against visibility by the rear bumper.

38. A method of ventilating air from a passenger-space in a motor vehicle, comprising the steps of:
  a. discharging used-up passenger-space air out of a passenger space,
  b. conducting the used-up passenger-space air through a gas tank space located between the passenger-space and a luggage space,
  c. conducting the used-up passenger-space air into an open-bottomed air conductor channel extending on a top of a floor of the luggage-space provided above an exhaust system,
  d. conducting the used-up passenger-space air past heated-up vehicle parts,
  e. cooling the heated-up vehicle parts by the used-up passenger-space air, and
  f. discharging the used-up passenger-space air into the outside atmosphere.

* * * * *